United States Patent [19]

Tateno et al.

[11] 4,098,241
[45] Jul. 4, 1978

[54] APPARATUS FOR PREVENTING AFTER-FIRE IN AN INTERNAL COMBUSTION ENGINE

[75] Inventors: Hidenori Tateno, Nagoya; Kazuo Nakano, Toyota, Japan

[73] Assignee: Toyota Jidosha Kogyo Kabushiki Kaisha, Toyota, Japan

[21] Appl. No.: 754,975

[22] Filed: Dec. 28, 1976

[30] Foreign Application Priority Data

Oct. 22, 1976 [JP] Japan .................. 51-126032

[51] Int. Cl.² ............... F02D 31/00; F02M 23/04
[52] U.S. Cl. .................. 123/97 B; 123/124 R; 123/124 A; 137/480; 261/DIG. 18
[58] Field of Search ............ 123/97 B, 103 R, 119 D, 123/119 DB, 124 R, 124 A, 124 B; 137/480; 261/DIG. 19, 34 B, 39 B

[56] References Cited

U.S. PATENT DOCUMENTS

| 1,841,749 | 1/1932 | Martin | 123/124 A |
|---|---|---|---|
| 1,922,266 | 8/1933 | Toman | 123/124 A |
| 2,145,230 | 1/1939 | Arrighi | 123/124 A |
| 3,670,709 | 6/1972 | Eckert | 123/124 A |
| 3,707,954 | 1/1973 | Nakada | 123/124 B |
| 3,721,222 | 3/1973 | Shioya | 123/124 A |
| 3,739,760 | 6/1973 | Charron | 261/DIG. 18 |
| 3,866,588 | 2/1975 | Nakada | 137/480 |
| 3,977,380 | 8/1976 | Atsumi | 123/124 B |

*Primary Examiner*—Charles J. Myhre
*Assistant Examiner*—David D. Reynolds
*Attorney, Agent, or Firm*—Stevens, Davis, Miller & Mosher

[57] ABSTRACT

Disclosed is an apparatus having an air control valve for introducing an amount of air into the intake system of an internal combustion engine when the engine begins to decelerate, for preventing after-fire of an unburnt air-fuel mixture in the catalytic converter arranged in an exhaust pipe of the engine. The apparatus further includes a temperature detecting valve adapted for stopping the operation of the flow control valve during engine warm-up operations. Therefore, introduction of air into the intake system is stopped even if the engine begins to decelerate and, also, a proper engine warm-up operation can be carried out.

2 Claims, 3 Drawing Figures

APPARATUS FOR PREVENTING AFTER-FIRE IN AN INTERNAL COMBUSTION ENGINE

FIELD OF THE INVENTION

The present invention relates to an apparatus for preventing after-fire of an unburnt air-fuel mixture at a catalytic converter arranged in an exhaust system of an internal combustion engine.

BACKGROUND OF THE INVENTION

In the operation of an internal combustion engine, the engine is in the state where misfire can readily take place when the engine begins to decelerate while the throttle valve of the engine is kept in its fully closed position. This is because a very rich air-fuel mixture, which cannot be ignited in the combustion chamber, is introduced into combustion chambers of the engine and, therefore, an unburnt air-fuel mixture is discharged into the exhaust system. The thus discharged unburnt air-fuel mixture, together with secondary air introduced into the exhaust system by an air injection system of the engine, is burnt in a catalytic converter arranged in the exhaust system to cause an explosive after-fire. As a result, the pressure in the exhaust system is elevated and exhaust gas is discharged from an exit of the exhaust system at sonic velocity. Therefore, not only a very large explosion is generated, which pollutes the sound environment around the vehicle, but also, damage is caused to parts of the exhaust system, for example the catalytic converter and muffler.

As means for preventing the undesired after-fire, there is already known an apparatus which has a vacuum operated air control valve which is opened for a predetermined time to introduce an amount of air into the intake system of the engine, when the engine begins to decelerate while the throttle valve is kept in its fully closed position. As a result of the introduction of this air, the very rich air-fuel mixture is diluted for proper combustion in the combustion chamber. Thus, the discharging of the unburnt air-fuel mixture into the exhaust system is prevented and, therefore, generation of the after-fire can be avoided.

However, in the above-mentioned known apparatus, the air control valve is opened for introducing the air into the intake system when the engine begins to decelerate, even if the engine is in a warming up operation. While warming up, the engine is in a very unstable state for complete combustion of the air-fuel mixture in the combustion chamber, due to the fact that the temperature of the engine is not yet fully elevated. Consequently, as a result of the unstable state of the engine during a warming up operation, the engine is easily stopped or abnormally operated if the air control valve is opened to introduce air into the intake system during such operation.

SUMMARY OF THE INVENTION

An object of the present invention is to provide an apparatus of the above-mentioned type, for preventing after-fire, which is also capable of stopping the operation of the flow control valve when the engine is in a warming up operation.

According to the invention, an apparatus is provided for preventing after-fire of an unburnt air-fuel mixture in the intake system of the internal combustion engine due to a misfire in the combustion chamber when the engine begins to decelerate while the throttle valve of the engine is kept in its fully closed position, which apparatus comprises: an air control valve, capable of being opened, for introducing air into the intake system of the engine, and; a vacuum actuator which includes a spring urged diaphragm connected to the air control valve, which diaphragm forms two chambers on the sides thereof, one of which is connected to a vacuum port formed in the engine intake system, and which diaphragm operates to open the air control valve when a predetermined pressure difference is formed between said chambers due to the engine beginning to decelerate, so that air is introduced into the engine intake system from the flow control valve during the engine deceleration condition, thereby preventing a misfire of the air-fuel mixture in the combustion chamber. The apparatus further comprises means for cancelling the pressure difference between said chambers formed on the sides of said spring urged diaphragm when the engine is not yet fully warmed up. Thus the air control valve is prevented from being operated while the engine is warming up.

BRIEF DESCRIPTION OF THE DRAWING

In FIG. 1, an internal combustion engine has an engine body 49 formed therein with combustion chamber 50 (only one is shown). An intake manifold 14 is connected to the combustion chambers 50 in order to supply an air-fuel mixture from a throttle valve 42 of the engine to the chambers 50. An exhaust manifold 52 is connected to the combustion chambers 50 for receiving the resultant exhaust gas. A catalytic converter 56 is arranged in an exhaust pipe 54 located downstream of the exhaust manifold 52. The engine is further provided with an air injection system having an air pump 58 connected to an air cleaner 60, by an air tube 59, and a check valve 61 and an air injection nozzle 62. The air injection system is adapted for introducing secondary air into exhaust manifold 52 of the engine, so that the CO and HC components remaining in the exhaust gas are oxidized in the catalytic converter 56 by said secondary air.

Figure 1:
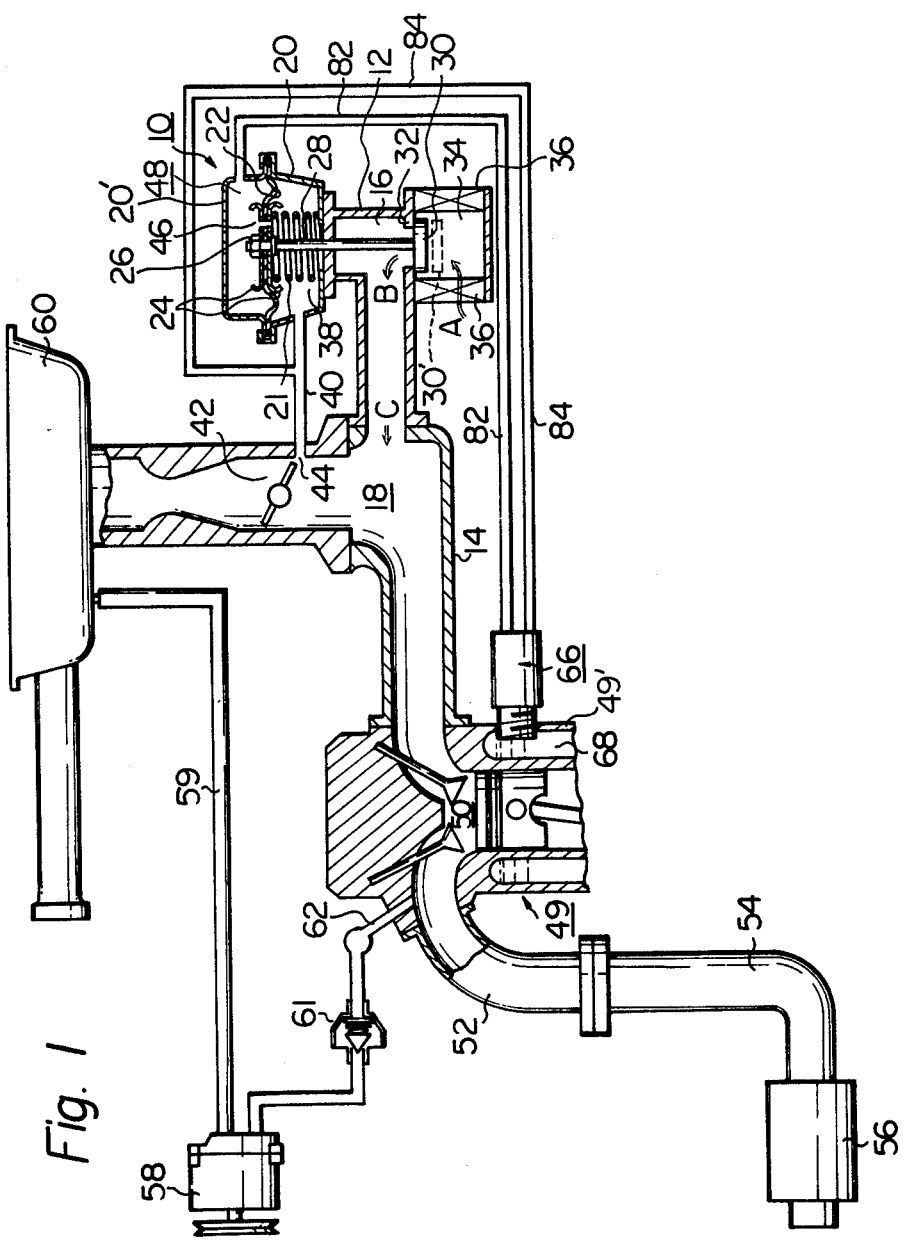
FIG. 1 is a diagrammatic view of an apparatus for preventing after-fire according to the present invention.

The internal combustion engine shown in FIG. 1 is further provided with an apparatus for preventing the after-fire of an unburnt air-fuel mixture in the catalytic converter 56. This apparatus is provided with an air control valve 10 adapted for introducing an amount of air into the engine when the engine begins to decelerate while the throttle valve 42 is kept in its fully closed position. This valve 10 includes a body 12 connected to the intake manifold 14 of the engine. In the body 12 a valve seat 32 is formed for forming an upper air chamber 16 on one side of the valve seat 32 and a lower air chamber 34 on another side of the seat 32. The upper chamber 16 communicates with an intake passageway 18 formed in the intake manifold 14. The lower chamber 34 communicates with the atmosphere via filter elements 36 secured to the body 12. A valve member 30 is arranged in the chamber 34, so that the member 30 faces the valve seat 32. The valve member 30 is connected to a diaphragm 22 via a rod 28. The diaphragm 22 is held at the peripheral portion thereof between a lower diaphragm case 20 secured to the body 12 and an upper diaphragm case 20' secured to the lower case 20. The diaphragm 22 is secured at its center portion to an upper end of the rod 28 by means of a set of plates 24 and a nut 26. As a result of this arrangement a vacuum chamber 38 is formed on the side of the diaphragm 22 adjacent to the body 12 and a vacuum chamber 48 is formed on the side of the diaphragm 22 opposite to the chamber 38. A coil spring 21 is arranged in the chamber 38 for causing the diaphragm 22 to be urged upwardly, so that the valve member 30 is urged toward the valve seat 32.

The vacuum chamber 48 formed on one side of the diaphragm adjacent to the air chamber 16 communicates, via a vacuum tube 40, with a vacuum port 44 formed the intake passageway 18. The port 44 is located slightly downstream of the throttle valve 42 when the valve 42 is fully closed as shown in FIG. 1. Orifices 46 are formed in the plates 24 and the diaphragm 22 sandwiched between the plates 24. Thus, the vacuum chamber 38 communicates with the vacuum chamber 48 opposite to the chamber 38, via the orifices 46.

In the above-mentioned arrangement, when the engine begins to decelerate while the throttle valve 42 is kept in its fully closed position as shown in FIG. 1, a very rich air-fuel mixture is formed in the intake passageway 18. In the fully closed position of the throttle valve 42, the portion of the intake passageway 18 located downstream of the throttle valve 42 is opened to the lower vacuum chamber 38 via the tube 40, so that a vacuum signal is transmitted to the chamber 38 from the port 44. Thus, the diaphragm 22 is displaced downwardly toward the body 12 against the force of the spring 21 due to the pressure difference between the lower chamber 38 and the upper chamber 48. As a result of this displacement, the valve member 30 is detached (opened) from the valve seat 32 as shown by the dotted line 30' in FIG. 1 After a predetermined time from the beginning of the deceleration the pressure difference between two chambers 38 and 48 becomes zero, because the vacuum signal is slowly transmitted into the chamber 48 from the chamber 38 via the orifices 46 so that the level of vacuum pressure in both chambers 38 and 48 is balanced. This causes the valve member 30 to be seated (closed) on the valve seat 32 by the force of the spring 21.

As a result of the opening (detaching) of the valve member 30 with respect to the valve seat 32 for the predetermined time from the beginning of deceleration, an amount of air, introduced into the lower air chamber 34 through the air filter members 36 as shown by an arrow A, is passed through the valve seat 32 toward the upper air chamber 16 as shown by an arrow B. The air thus introduced into the chamber 16 is introduced into the intake passageway 18 as shown by an arrow C. As a result of the introduction of an amount of air into the intake passageway 18, the very rich air-fuel mixture formed in the intake passageway 18 when the engine begins to decelerates is diluted for proper combustion in the combustion chambers 50. As a result of this, the movement of an unburnt air-fuel mixture into the exhaust manifold 52 from the combustion chambers 50 is prevented and, thus, after-fire in the catalytic converter 56 does not occur.

The heretofore described construction and operation are substantially the same as that of known arts. However, the apparatus according to the invention has the hereinafter described construction for preventing the operation of the air control valve 10, when the engine is in a warming up operation in which the temperature of the engine is not yet fully elevated. To this end a temperature detecting valve 66 is mounted on the engine body 49 in order to sense the temperature of engine cooling water stored in a water jacket 68 formed in the engine body 49 around the combustion chambers 50.

Figure 2:
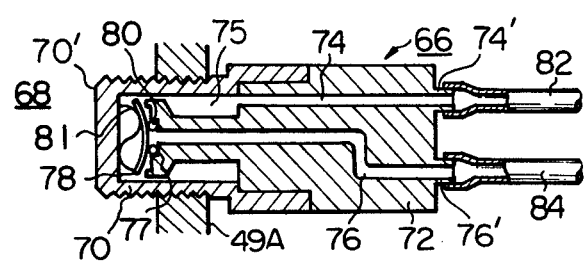
FIG. 2 is a cross-sectional view of the temperature detecting valve in FIG. 1, which is in its closed position.

As shown in FIG. 2, the valve 66 has a casing 70 of cup shape which is screwed into an outer side wall 49' of the engine body 49 (FIG. 1), so that a closed end 70' of the casing 70 comes into contact with the engine cooling water in the jacket 68. An inner body 72, which has two passageways 74 and 76 therein, is inserted into an opened end of the casing 70 opposite to the closed end 70'. One end of the passageway is opened to a space 75 in the casing 70, and the other end of the passageway 74 forms a first valve port 74' which communicates with the vacuum chamber 48 (FIG. 1) of the air control valve 10 via a vacuum tube 82. One end of the passageway 76 (FIG. 2) has a shoulder portion 77, and the other end of the passageway 76 forms a valve port 76' which communicates, via a vacuum tube 84, with the vacuum tube 40 (FIG. 1) connecting the vacuum port 44 and the vacuum chamber 38 with each other. A bimetal member 78 (FIG. 2), capable of changing its convex shape as shown in FIG. 2 or in FIG. 3 in accordance with the temperature of the cooling water in the jacket 68, is arranged in the casing 70 near the closed end 70' thereof. An O-ring 80 is arranged between the shoulder portion 77 and the bimetal member 78. A spring 81 urges the bimetal member 78 toward the inner casing 72.

Figure 3:
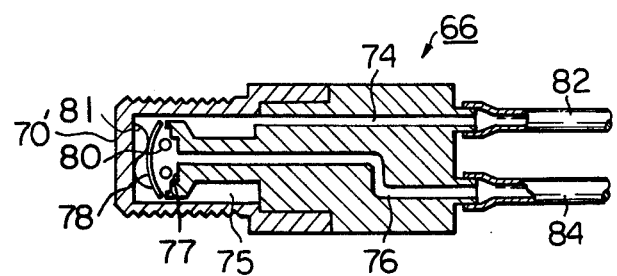
FIG. 3 is a cross-sectional view similar to that in FIG. 2, except that the temperature detecting valve is in its opened position.

When the temperature of the cooling water in the water jacket 68 is not as high as a predetermined temperature, the valve 66 is in its opened position in which the bimetal member 78 is curved so that it is convex toward the end 70' of the casing 70, as shown by FIG. 3, against the force of the spring 81. This causes the O-ring 80 to be detached from the shoulder portion 77. As a result of this, in the opened position of the valve 66, the passageway 76 is opened to the space 75, which communicates with the passageway 74. Therefore, the first valve port 74' and the second valve port 76' are connected to each other in this opened position of the valve 66. When the temperature of the cooling water in the water jacket 68 exceeds the predetermined temperature, the valve 66 switches to its closed position in which the bimetal member 78 is curved so that it is convex toward the O-ring 80, as shown in FIG. 2, causing the O-ring 80 to rest on the shoulder portion 77, by the force of the spring 81. As a result of this, communication of the passageway 76 with the space 75 is prevented. Therefore, the first valve port 74' and the second valve port 76' are disconnected from each other in this closed position of the valve 66.

OPERATION

When a sufficient period of time has not elapsed from the starting of the engine (in other words when the engine is warming up), the temperature of cooling water in the water jacket 68 is not elevated to the predetermined temperature, so that the bimetal member 78 has the convex shape as shown in FIG. 3. Thus, the valve 66 is in its opened position in which the first valve port 74' and the second valve port 76' are connected to each other. Therefore, the lower vacuum chamber 38 of the air control valve 10, communicating with the valve port 76' via the vacuum tubes 84 and 40, is connected to the upper vacuum chamber 48 of the valve 10, communicating with the valve port 74' via the vacuum tube 82. As a result of connection between the chambers 38 and 48 no pressure difference is formed therebetween regardless of the position of the throttle valve 42 (in other words the vacuum level at the vacuum port 44). This causes the valve member 30 to be rested on the valve seat 32 by the force of the spring 21. Therefore, the air control valve 10 does not open during the warm-up condition even if the rotation of the engine is decelerated while the throttle valve 42 is kept in its fully closed position.

When a sufficient period of time has elapsed from the starting of the engine (in other words when the temperature of the engine is fully elevated), the temperature of the cooling water in the jacket 68 exceeds the predetermined temperature, so that the bimetal member 78 has the convex shape as shown in FIG. 2. Thus, the valve 66 is switched to its closed position in which the first valve port 74' and the second valve port 76' are disconnected from each other. Therefore, the communication of the lower vacuum chamber 38 with the upper vacuum chamber 48 is prevented. Thus, a pressure difference can be formed between the chambers 38 and 48 when the throttle valve 44 is closed so that it is situated upstream from the vacuum port 44. Therefore, when the engine begins to decelerate while the throttle valve 42 is kept in its fully closed position, the air control valve 10 is opened for introducing an amount of air into the intake passageway 18 as shown by the arrows A, B and C. As a result of the introduction of air, the after-fire in the catalytic converter 58 is prevented, as has been described already.

In the above-mentioned embodiment the temperature detecting valve 66, having the bimetal member 78, is used. However, in place of this type of valve, another type of temperature detecting valve can be used.

It should be noted that many changes and modifications can be made to the above described invention by those who are skilled in this art, without departing from the scope and sprit of the invention.

What is claimed is:

1. In an apparatus for preventing after-fire of an unburnt air-fuel mixture in the intake system of the internal combustion engine due to a misfire in the combustion chambers when the engine begins to decelerate while the throttle valve of the engine is kept in its fully closed position, which apparatus comprises an air control valve capable of being opened for introducing air into the intake system of the engine and a vacuum actuator which includes a spring urged diaphragm connected to the air control valve, which diaphragm forms two chambers on the sides thereof, one of which is connected to a vacuum port formed in the engine intake system, and which diaphragm operates to open the air control valve when a predetermined pressure difference is formed between said chambers due to the engine beginning to decelerate, so that an amount of air is introduced into the engine intake system by the opened air control valve from the beginning of the engine deceleration, thereby preventing a misfire of the air-fuel mixture in the combustion chamber, the improvement that comprises temperature detecting valve means having two valve ports and a temperature sensing valve member for connecting said ports to each other until the engine is fully warmed up, and for thereafter disconnecting said ports from each other, two pipe means, connecting said two valve ports with said two chambers of the vacuum actuator, respectively, whereby said two chambers are connected to each other when the engine is not fully warmed up, in order to cancel the pressure difference between the two chambers.

2. An apparatus for preventing after-fire according to claim 1, wherein said temperature sensing valve member is arranged in the cooling water jacket of the engine in order to detect the temperature of the engine cooling water.

* * * * *